Patented Mar. 28, 1950

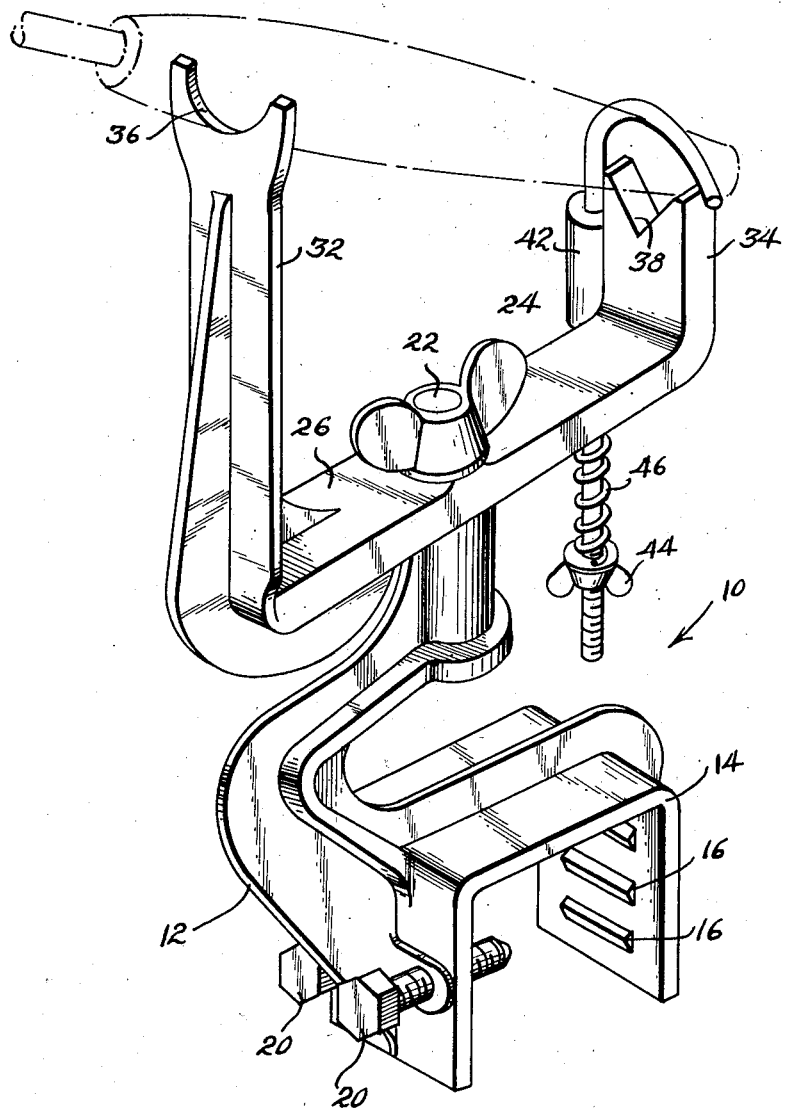

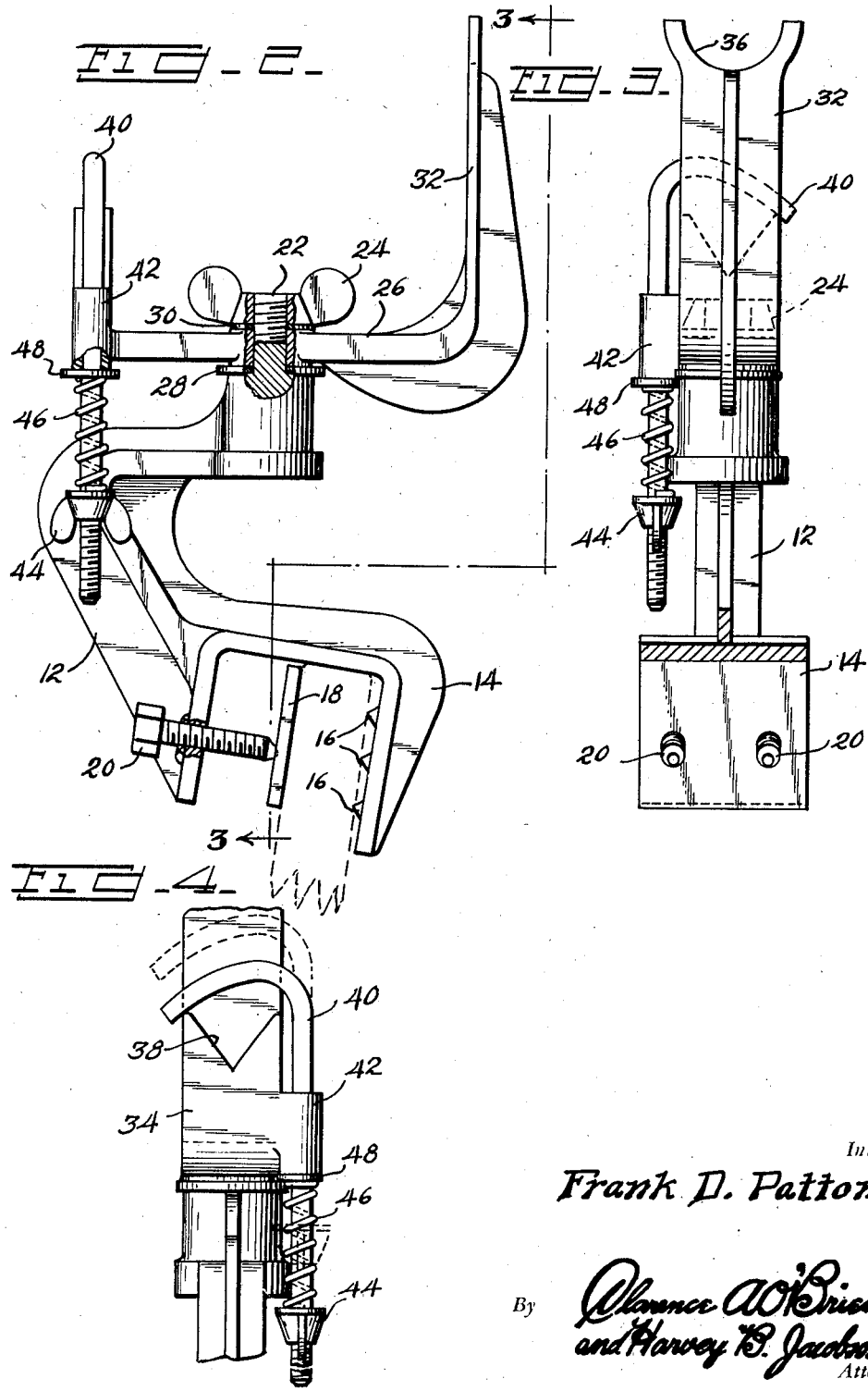

2,502,272

UNITED STATES PATENT OFFICE 2,502,272

FISHING POLE HOLDER

Frank D. Patton, Laytonville, Calif.

Application November 13, 1946, Serial No. 709,523

3 Claims. (Cl. 248—42)

This invention relates to an improved device for holding fishing rods in desired adjusted positions. Often the fisherman tires of holding the rod continually and often there are duties to perform which require the full attention of the fisherman at which time the fishing instrumentalities must be stored or pulled in, which is a very inconvenient operation to perform.

Accordingly, an object of this invention is to provide a device for holding fishing rods in an operative position.

Another object of this invention is the provision of adjusting means for regulating the desired radial angle.

A still further object of this invention is to provide a device of the character described including adjustable means which adapts the device for effectively holding a plurality of sizes of fishing rods.

A still further object of this invention is the provision of a novel shock absorber means for dampening the shock transmitted when a large fish strikes.

Another object of this invention resides in the provision of an inexpensive, simple, efficient and practical device adapted to be secured to boats, bridges and the like.

Other objects and features of invention will be specifically pointed out or will become readily apparent to those skilled in the art in following the description of the preferred embodiment of the inventive concept illustrated herewith, wherein:

Figure 1 is a perspective view of the instant invention showing its use with a fishing rod;

Figure 2 is a side view partly in elevation and partly in cross section showing the instant invention;

Figure 3 is a front view partly in elevation and partly in section taken on the line 3—3 of Figure 2 and in the direction of the arrows, and Figure 4 is a detail showing the novel shock absorbing means and adjustable fishing instrument holder means.

Referring now more in detail to the accompanying drawings wherein like reference characters are used to indicate similar parts throughout the views thereof, the reference numeral 10 is used to indicate in general terms a preferred embodiment of the instant invention.

A stand 12 composed of some suitable material, preferably metallic, is provided having on one end thereof a C clamp-like member 14 having elongated protuberances 16 integral with one side thereof adapted to cooperate with the pressure plate 18 in rigidly securing the said stand to a boat, bridge, peg or the like. A pair of securing means, preferably bolts 20 as shown, is provided in suitable threaded apertures in the member 14 for urging the pressure plate 18 against the object to which the device is to be clamped.

Secured to the upper portion of the said stand 12 or forming a continuation thereof is a stud 22 having screw threads therearound for receiving a wing nut 24. A suitable U-shaped bracket or channel 26 having an aperture substantially midway between the ends thereof is received on the said stud 22 and is adapted to be clamped tightly thereon by means of the said wing nut 24 having suitable bearing washers 28 and 30 interposed therebetween.

The front end or leg 32 of the herein before mentioned channel 26 is slightly longer than the opposite leg 34. This construction is provided for holding the fishing rod in a fixed horizontal inclination. At the extremity of the said leg 32 is an arcuate, preferably semi-circular notch 36 adapted to receive the handle of a fishing pole. At the extremity of the said leg 34 a notch, preferably V-shaped, designated by the numeral 38, is adapted to cooperate with the hook 40 for retaining the fishing rod grasping the same and resiliently holding it therein.

A sleeve member 42 formed as a continuation from the side of the leg 34 receives the elongated portion of the said hook member 40 in slidable engagement therein. An adjustable means, preferably a simple wing nut 44 as shown in the drawings, is provided on suitable threads on the elongated portion of the said hook 40 and a spring 46 is interposed between the said wing nut and a suitable bearing washer 48 abutting the bottom portion of said sleeve member 42.

The operation of the device is now quite evident. In the front end or leg 32 of the said channel-like member 26 is a portion of the handle of a fishing rod received in the leg 34 and secured therein by means of the hook 40 cooperating with the notch 38, is the rearward portion of the said handle of the fishing rod. The channel member and therefor the fishing rod, is swung about the stud 22 acting as a pivot, and is secured in the desired position by means of the clamping means 24. From an inspection of Figure 2 it is quite obvious that the hook member 40 may be raised or lowered as shown in Figure 4, in order to suitably retain a variety of large or small diameter fishing rod handles. It is also obvious that the resilient means 46 cooperating with the wing nut 44 as a bearing and the bottom portion of the sleeve 42 as the second bearing, forms an effective shock absorber dampening the shock produced when a fish is caught.

While there has been described herein but a single preferred embodiment of the instant invention it will be readily apparent to those skilled in the art that like modifications may be made therein, including omissions and additions without departing from the spirit and scope of the invention as set forth in the accompanying claims.

Having thus described the instant invention, what is claimed as novel is:

1. A fishing rod holder comprising a stand having a substantially U-shaped portion at one end thereof for anchoring the same and having a pivot pin at the other end thereof, a substantially U-shaped frame including leg members and having an aperture, said pivot pin extending through said aperture thereby pivotally securing said frame to said stand, a pair of notches in the leg members of said U-shaped frame, a sleeve secured to one of said leg members, an adjustable resiliently biased hook slidably received in said sleeve and cooperating with said one of said notches for retaining one of a plurality of diameter size fishing rods.

2. A fishing rod holder comprising a stand, anchoring means on said stand, a substantially U-shaped frame member having legs formed with rod receiving notches, rotatably secured to said stand, a sleeve secured to a leg, a hook having a shank slidably received in said sleeve, and means on said shank and cooperating with said sleeve for resiliently biasing said hook.

3. A fishing rod holder comprising a stand, anchoring means on said stand, a substantially U-shaped frame member having legs formed with rod receiving notches, rotatably secured to said stand, a sleeve secured to a leg, a hook having a shank slidably received in said sleeve, means on said shank and cooperating with said sleeve for resiliently biasing said hook, said resilient biasing means comprising a spring, and an adjustable member secured to said shank for compressing said spring.

FRANK D. PATTON.

REFERENCES CITED

The following references are of record in the file of this patent:

UNITED STATES PATENTS

| Number | Name | Date |
|---|---|---|
| 1,267,116 | Regel | May 21, 1918 |
| 1,534,642 | Hoaglund | Apr. 21, 1925 |
| 1,583,934 | Leggett | May 11, 1926 |
| 2,143,109 | Hadaway | Jan. 10, 1939 |
| 2,255,531 | Pittman | Sept. 9, 1941 |
| 2,287,641 | Russell | June 23, 1942 |
| 2,289,592 | Riedi | July 14, 1942 |